United States Patent
Swanson et al.

[15] 3,661,420
[45] May 9, 1972

[54] CONTRA-LEVERAGE CONSTRUCTION FOR A TRUCK-AND-LIKE STAKE

[72] Inventors: Raymond W. Swanson, 14515 Cornishcrest Road, Whittier, Calif. 90604; Marvin M. Yaffe, deceased, 5542 Sierra Vista Avenue, Los Angeles, Calif. 90038; Beverly Ruth Yaffe, administratrix, 1165 S. O. M. Center Road, #305 Mayfield Heights, Ohio 44124

[22] Filed: July 19, 1968

[21] Appl. No.: 746,043

[52] U.S. Cl. ........................................296/43, 105/380
[51] Int. Cl. ..................................................B60p 7/06
[58] Field of Search ............295/43, 10; 280/143, 147, 146; 105/380, 383

[56] References Cited

UNITED STATES PATENTS

| | | | |
|---|---|---|---|
| 405,474 | 6/1889 | Hoepfner et al. | 296/43 |
| 506,385 | 10/1893 | Whitworth | 105/383 |
| 594,455 | 11/1897 | Armstrong | 280/143 |
| 792,742 | 6/1905 | Tew | 105/383 |
| 1,548,518 | 8/1925 | Edlich | 296/43 |
| 1,762,618 | 6/1930 | Dymock | 296/43 |

FOREIGN PATENTS OR APPLICATIONS

| | | | |
|---|---|---|---|
| 136,077 | 8/1933 | Austria | 296/10 |
| 350,879 | 1/1961 | Switzerland | 296/10 |

*Primary Examiner*—Benjamin Hersh
*Assistant Examiner*—John A. Pekar

[57] ABSTRACT

For a combination of a truck with horizontally positioned load platform, a truck stake, a truck stake receptacle and a truck load over said platform a means for tilting the truck stake towards the truck load for increasing the truck stake resistance to the truck load leverage pressure thereagainst when an end section of the truck stake is inserted into the truck stake receptacle and the truck stake receptacle is secured with the horizontally positioned load platform and the load is loaded over the latter.

1 Claim, 21 Drawing Figures

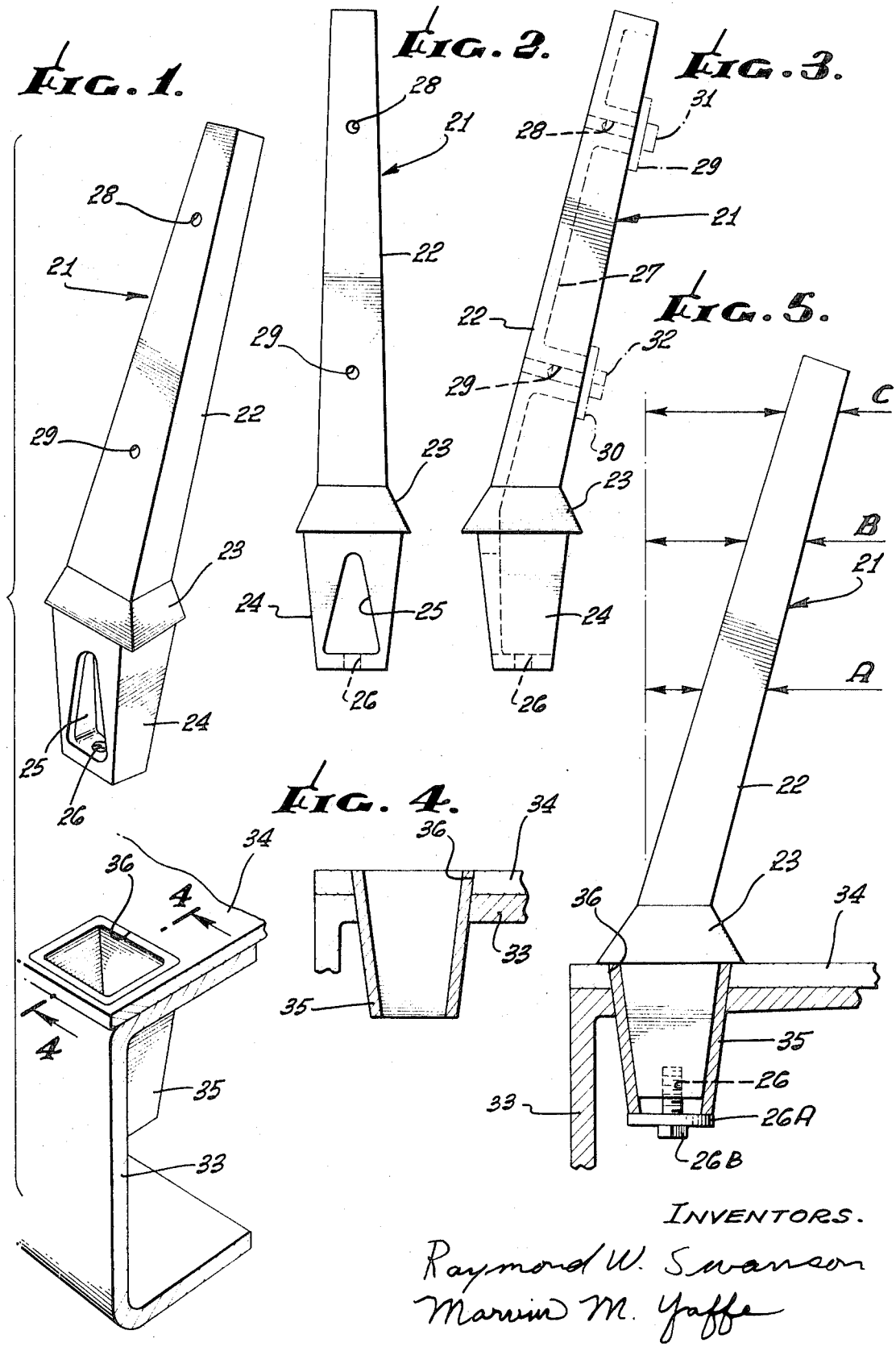

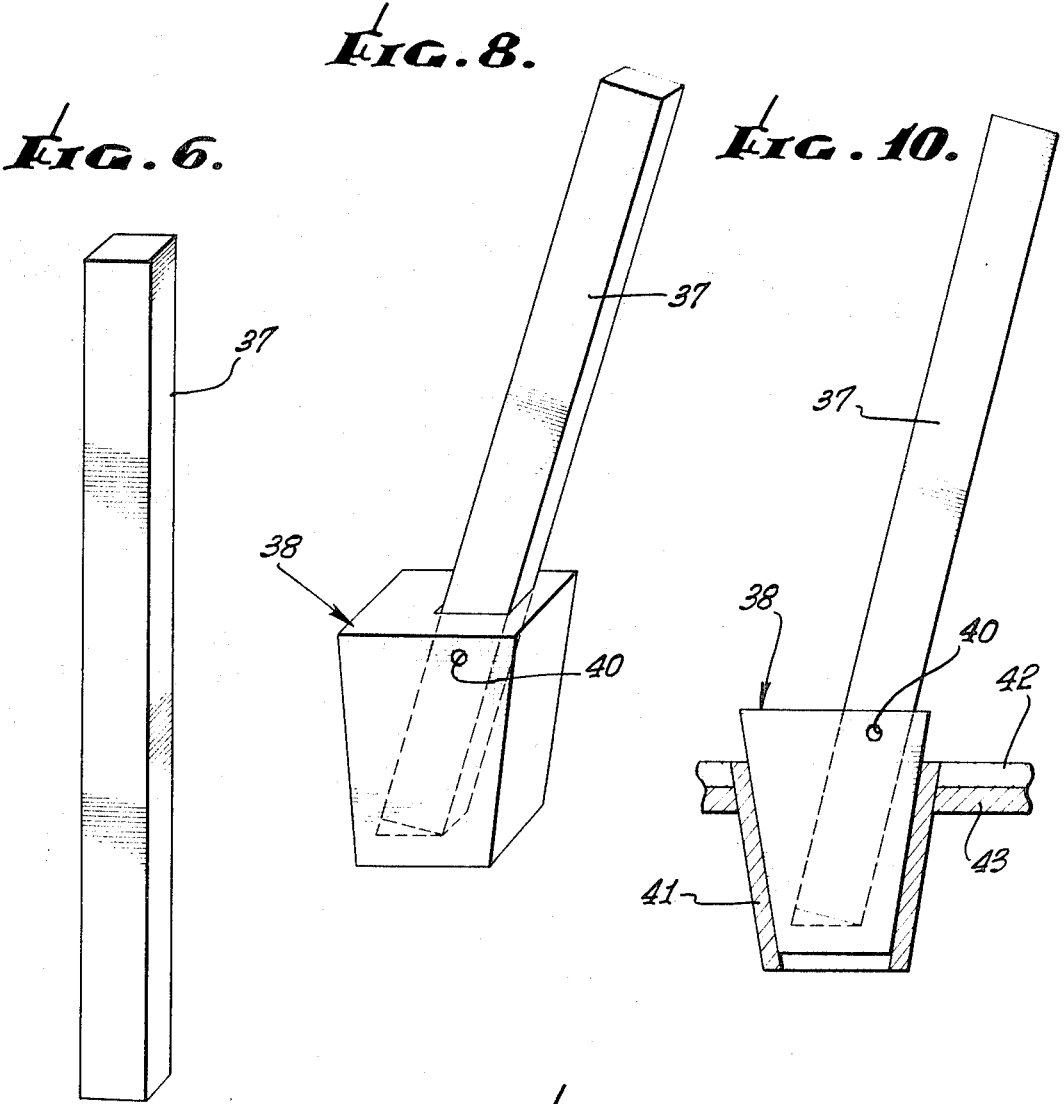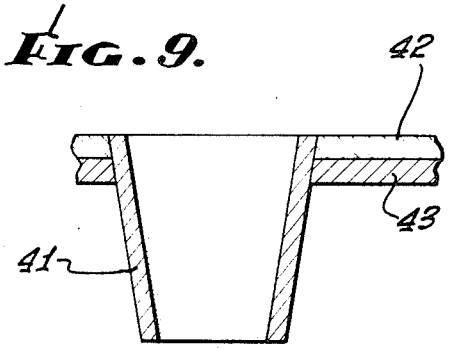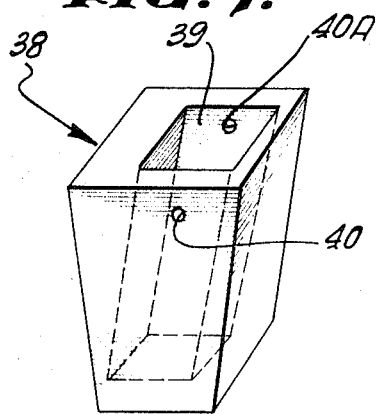

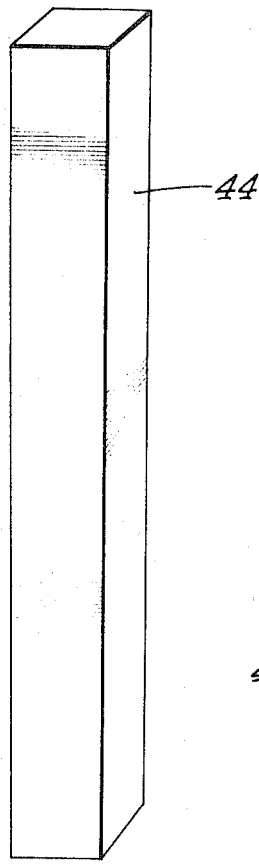
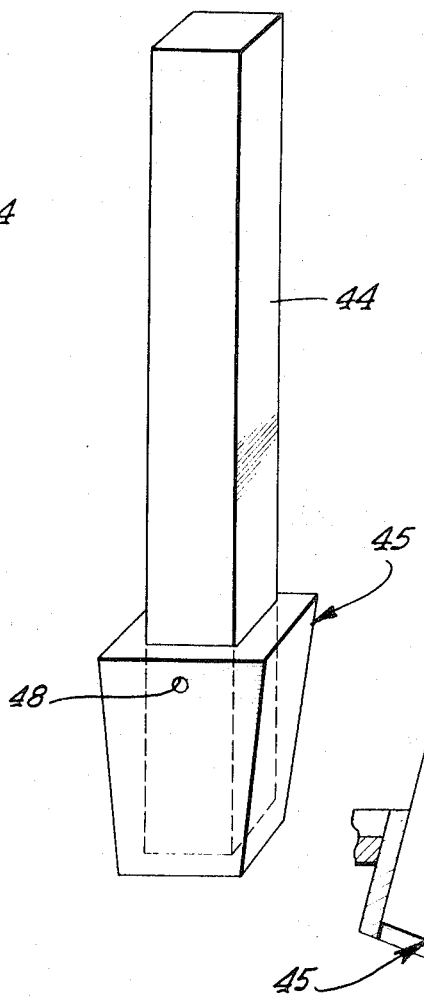
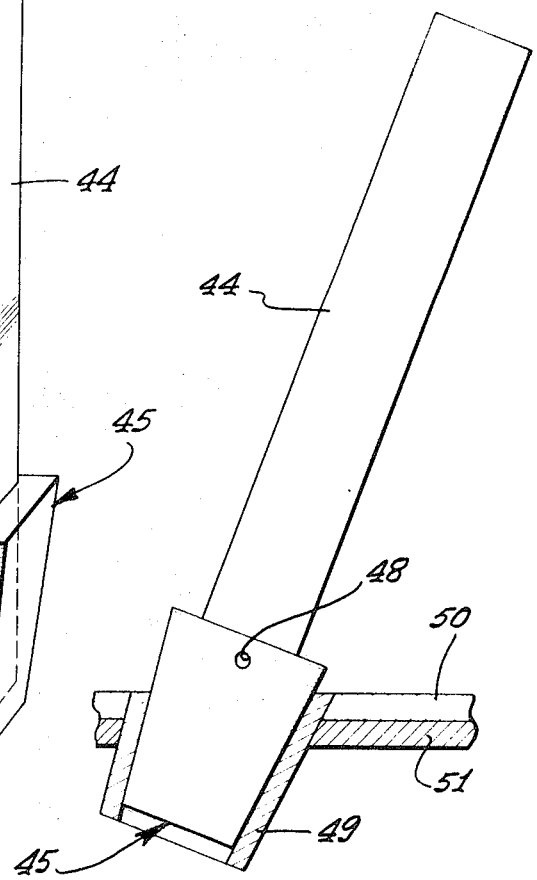
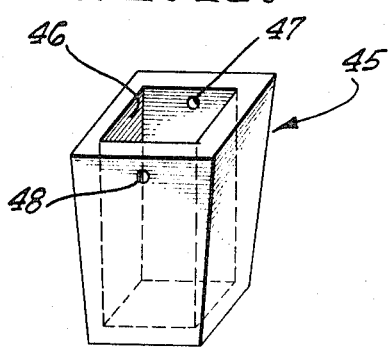
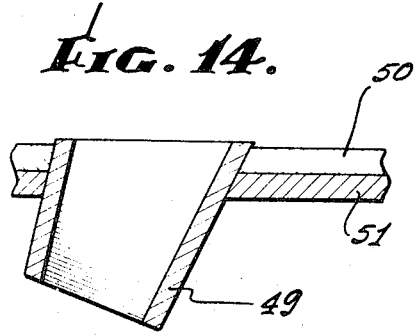

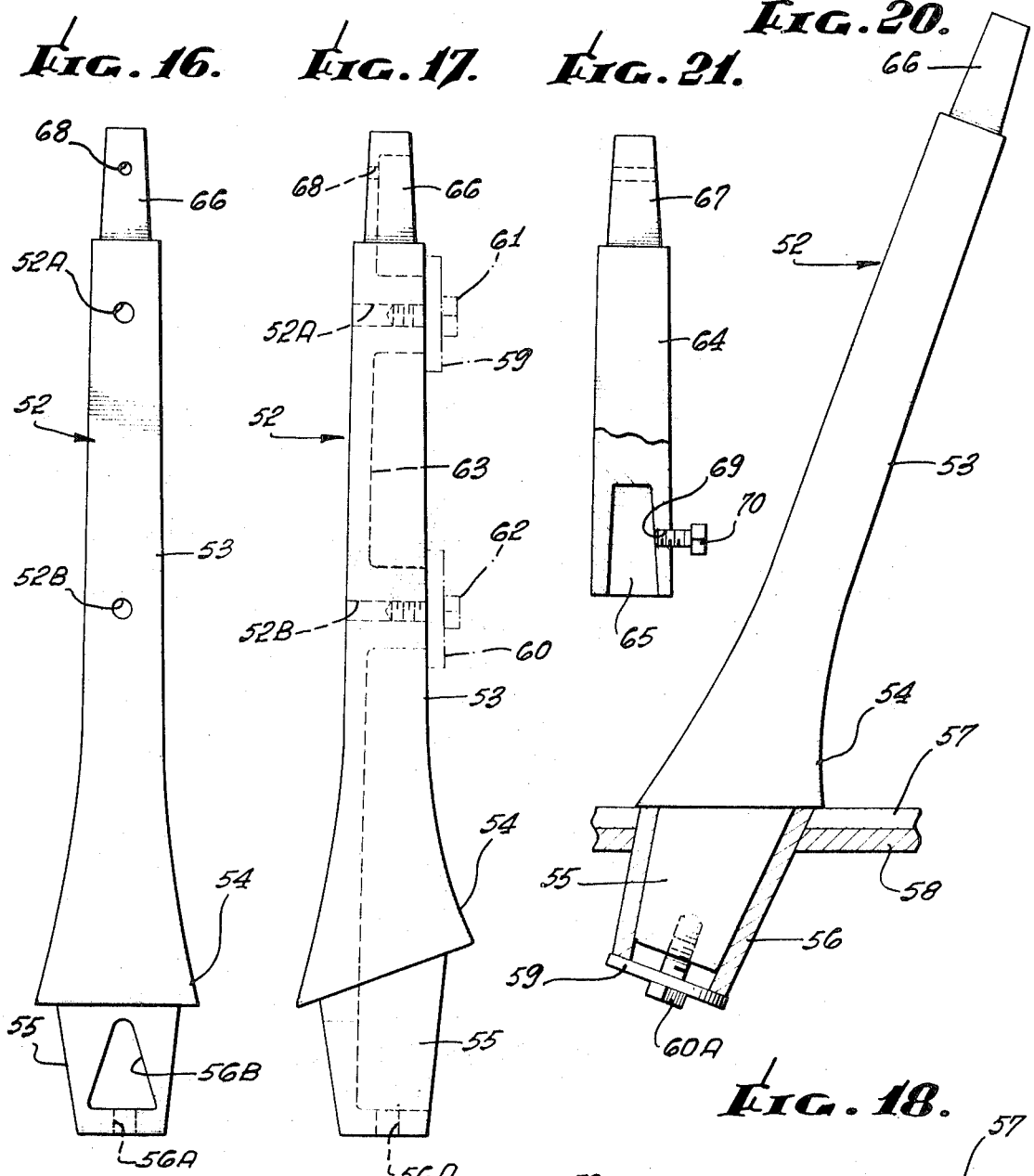

CONTRA-LEVERAGE CONSTRUCTION FOR A TRUCK-AND-LIKE STAKE

BACKGROUND OF THE INVENTION

1. Field of the invention

The present invention relates to trucks and like and more specifically to the truck-and-like stakes and elements for holding them in the truck in a position related to a truck load.

2. Description of the prior art

A conventional truck stake is straight and ordinarily is held perpendicularly to the truck loading platform.

The higher is the truck load the greater, of course, is the load-height leverage pressure against the truck stakes securement points with the truck, especially when the carrier starts or stops abruptly, or likewise changes speeds, or makes sharp turns, which many trucks usually do.

Since modern trucks frequently carry very high loads, their leverage pressure against stakes securement points increase accordingly and often results in the ordinary truck stakes being illegally bent outwardly or even broken, especially when made conventionally of wood.

Heretofore to overcome to a certain extent such occurrences some truckers tied the inwardly opposite stakes together with ropes or chains after loading the truck which, naturally, called for removing same before unloading and thus took up double extra time and labor and, consequently, added to the transportation costs, aside from being very awkward in procedure, effort and appearance.

Conventionally truck manufacturers provide a plurality of tetragon, usually tapering downwardly, vertical pockets in the floor of the truck loading platform along the edge-sections thereof and perpendicularly thereto and adapted for housing likewise shaped removable metal receptacles each stationary secured with a conventional straight wooden stake via the stake end-section inserted into such receptacle and nailed or bolted therewith through holes provided in protruding upwardly side walls of the receptacle.

Such conventional structure of the stake and means for holding it in a truck are naturally responsible for the stake being held originally in perpendicular to the truck platform position and thus most susceptible to a leverage pressure and subject to maximum disadvantage of being bent outwardly beyond the truck confines, which is forbidden by traffic laws, and even broken under a high load leverage pressure.

The original concept of this invention is a new application of an old, tried and proven, physical and geometrical principle for resisting a push or pressure against an upwardly exposed surface by holding said surface tilted against such push or pressure. However, in relation to a truck stake vs. truck loads of various heights this invention additionally discovers and discloses that tilting the stake against the load compensates proportionally for the increase of leverage thrust thereagainst by proportionally increasing the leverage thrust resisting distance between the point of leverage force impact and an imaginary vertically perpendicular to the platform line from the securement point of the tilted stake, as opposed to the stake conventionally held against the same leverage force where normally there would be no such lever force resisting distances and no proportional or other compensations for the leverage increases against its point of securement with the truck.

SUMMARY OF THE INVENTION

The prime object of this invention is to apply the above concept, principle and discovery to the improving accordingly a truck stake and a means for holding it in a truck-or-like, and to reduce to practice said concept, principle and discovery in connection therewith.

Another object of this invention is to provide a plurality of modifications thereof for satisfying various needs of various users without sacrificing the advantages of this invention.

Still another object of this invention is to provide a new and original means for holding the upwardly exposed section of a truck stake in a new and original for a truck stake position, i.e. tilted against a truck load for compensating proportionally the upward increase of leverage against the stake point of securement by thus proportionally increasing the distance between the point of the leverage force impact by the truck load and an imaginary vertical line extending perpendicularly to the truck loading platform from the stake point of securement in the truck.

Also an object of this invention is to provide a one-piece truck stake, preferably of cast, forged or extruded lightweight heat treatable metal or other similarly suitable material, and having its substantially long section adapted for outside exposure, and a relatively short end-section adapted for fitting directly into the truck conventional stake-pocket, ordinarily provided in the truck platform for the conventional removable intermediary stake metal receptacle, thereby eliminating the need for the latter; and having said long section at a dependent angle to said short end-section for assuming inwardly tilted position over the truck loading platform when the short end-section is inserted into and held in said conventionally provided ordinary truck-stake-pocket.

A further object of this invention is to provide for the relatively short end-section of a conventional straight truck stake an improved metal intermediary receptacle having the outside walls shaped to removably fit into the conventional truck stake pocket ordinarily provided in the truck loading platform, and the inside walls of said improved receptacle being at tilting angles in relation to the truck platform level and adapted for the exposed long section of ordinarily straight stake to assume inwardly a tilted position upwardly over the truck loading platform when the short end-section of said conventional stake is secured in said improved intermediary receptacle and the latter is removably inserted into and held in dependent position in the conventional truck stake product.

A still further object of this invention is to provide for the relatively short end-section of a conventional straight truck stake with its conventional metal receptacle an improved truck stake pocket in the truck platform, said pocket having its receptacle receiving walls at tilting angles in relation to the truck-platform-level and adapted for the exposed long section of a conventional straight truck stake to assume inwardly tilted position upwardly over the truck loading platform when the short end-section of the stake in its conventional intermediary metal receptacle are removably inserted and held in said improved truck stake pocket.

Consequently, another object of this invention is to provide a one-piece conventionally straight shaped truck stake, preferably of cast, forged or extruded lightweight heat-treatable metal or other suitable material and having its relatively short end-section adapted for fitting directly into an improved truck stake pocket in the truck loading platform, said pocket having its downwardly tapering teragon walls at tilting angles inwardly in relation to the truck-platform-level and adapted for the exposed long section of said straight one-piece stake to assume inwardly tilted position upwardly over the truck loading platform when the short end-section of the stake is removably inserted into and held in said improved truck stake pocket.

It is, of course, also a very important object of this invention to make its reduction to practice simple, easy and inexpensive to manufacture, durable and easy to operate.

To illustrate by suitable examples how the above and other objects of this invention may be practically achieved reference now is being made to the accompanying drawings.

BRIEF DESCRIPTION OF THE DRAWINGS

In the drawings:

FIG. 1 is a perspective view of a truck stake comprising principles of this invention, and, therebelow, of a section of a truck loading platform secured over a section of the truck frame, and of a truck conventional stake pocket.

FIG. 2 is a front view of the stake shown in FIG. 1.

FIG. 3 is a side view of the stake shown in FIGS. 1 and 2.

FIG. 4 is a cross sectional view taken at 4—4 of FIG. 1.

FIG. 5 is a side view of the stake shown in FIG. 3 and inserted into and secured in the truck stake pocket shown in cross section as in FIG. 4.

FIG. 6 is a perspective view of a conventional truck stake.

FIG. 7 is a perspective view of the stake-end-section intermediary receptacle comprising principles of this invention.

FIG. 8 is a perspective view of the stake shown in FIG. 6 and partually inserted and secured in the receptacle shown in FIG. 7.

FIG. 9 is a cross sectional view of a conventional truck stake pocket substantially similar to as shown in FIG. 4.

FIG. 10 is a side view of the assembly shown in FIG. 8 and inserted into the truck stake pocket shown in FIG. 9.

FIG. 11 is a perspective view of a conventional truck stake substantially similar to the shown in FIG. 6.

FIG. 12 is a perspective view of a conventional stake-end-section intermediary receptacle.

FIG. 13 is a perspective view of the stake-end-section of the stake shown in FIG. 11 and inserted and secured in the receptacle shown in FIG. 12.

FIG. 14 is a cross-sectional view of a truck stake pocket in its securement in a section of a truck and comprising principles of this invention.

FIG. 15 is a side view of the assembly shown in FIG. 13 and inserted into the truck stake pocket shown cross-sectionally as in FIG. 14.

FIG. 16 is a front view of a one-piece truck stake comprising some of the features of this invention.

FIG. 17 is a side view of the stake shown in FIG. 16.

FIG. 18 is a cross-sectional view of a truck stake pocket comprising principles of this invention and substantially as shown in FIG. 14.

FIG. 19 is a cross-section taken at 19—19 of FIG. 18.

FIG. 20 is a side view of the stake shown in FIG. 17 and inserted and secured in the truck-stake-pocket shown cross-sectionally as in FIG. 18.

FIG. 21 is a side, sectionally cross-sectional view of a separate extension for the truck stake shown in FIG. 16, and shows a means for securing it thereover therewith.

DESCRIPTION OF THE PREFERRED EMBODIMENTS

In reference to the drawings:

FIGS. 1–5 pertain to an improved truck stake 21 which serves the basic principle of this invention when inserted in a truck conventional stake pocket 35 (as shown in FIG. 5).

Stake 21 is a one-piece truck stake adapted for eliminating the conventional intermediary stake receptacle heretofore used for securement therein of the stake-end section and for placement therewith into the truck conventional stake pocket 35. Instead of said intermediary receptacle, stake 21 has its lower, relatively short section 24 of a dependent size and shape to fit directly into and in the conventional truck pocket 35.

Stake 21 in its entirety can be made of a cast, forged or extruded lightweight heat-treatable metal or of any other likewise suitable and durable material.

Elongated section 22 of the stake 21 is at an angle to its short section 24 (FIGS. 1 and 3) adapted for said elongated section 22 to assume an inwardly tilted position towards truck loads A,B and C, in FIG. 5, when its short section 24 is inserted into the truck pocket 35 in a dependent position as shown in FIG. 5.

Stake pocket 35 is conventionally secured with a truck frame 33 and the, mounted thereover, truck loading platform 34 through opening 36 (FIG. 1).

The higher a truck load of similar nature the greater leverage pressure it exercises against a truck stake under truck driving conditions. For example, over the truck loading platform 34 (FIG. 5) a truck load of 'B' height has greater leverage power against a conventional (straight) truck stake then, for instance, a similar load of 'A' height; and a load of 'C' height will have ordinarily a greater leverage power than the load of 'B' height against said conventional (straight) stake.

Through medium of this invention, however, said increases of said load leverage power against the stake 21 are being successively and proportionally contra-acted by the ever upwardly increasing inward incline of the tilting section 22 of stake 21, whereby the upwardly successive points of load impact against stake 21 are farther and farther away inwardly from the indicated vertical line which would be the initial position of a conventional (straight) truck stake, and which vertical position is, naturally, a defenseless and noncompensating position against the oncoming leverage force as compared to an inclined position thereagainst.

Stake 21 may be provided with plain or threaded openings 28, 29 and like for bolts or screws (31,32 and like) to secure conventional parallel horizontal side boards (29,30 and like) with a plurality of likewise lined-up stakes.

To reduce weight of stake 21 without substantial sacrifice of its strength, an opening 25 (FIGS. 1 and 2) or like or more may be provided along and through the front and back walls of the stake, and/or a section 27 or sections of the back of the stake 21 may be hollowed, for instance as indicated by dotted lines in FIG. 3.

To add to the strength and resistance of the stake 21, a sidewise protruding shoulder 23 (or appropriate sections thereof) may be provided between sections 22 and 24 of stake 21 and adapted to assume a dependent position against the upper edges of the truck-stake-pocket 35 and even over a section of the truck-loading-platform 34 when section 24 of stake 21 is fully inserted into pocket 35, as shown in FIG. 5.

To make it more difficult to steal the stakes from a truck, a means may be provided for inconspicuous locking of the stake 21 with the truck pocket 35, for instance, a threaded opening 26 may be provided in the bottom wall of stake 21, an oversized washer 26A placed under and against the lower edges of the pocket 35, and a screw 26B inserted through the washer 26A and screwed into the threaded opening 26 of stake 21 inserted into pocket 35 as shown in FIG. 5.

FIGS. 6–10 pertain to a modification where an improved truck-stake-intermediary-receptacle 38 serves the basic principle of this invention when engaged with a conventional (straight) truck stake 37 and inserted into a conventional truck stake pocket 41.

Here an intermediary stake receptacle 38 has its outside side walls shaped for removably fitting into a conventional truck stake pocket 41 conventionally secured through and with the truck frame 43 and the truck loading platform 42. The inside walls 39 of the receptacle 38 are tilted, as indicated in FIG. 7, and adapted as a receptacle for the end-section of the conventional stake 37. Holes 40 and 40A are provided through the side walls of the upper section of receptacle 38 to bolt or nail the stake 37 with receptacle 38 when the stake 37 end-section is inserted into receptacle 38, as shown in FIG. 8.

When the assembly shown in the latter figure is inserted in a dependent position via receptacle 38 into the pocket 41, the stake 37 will assume inwardly tilted position in relation to the truck loading platform 42 and serve substantially as described in reference to the stake 21 in FIG. 5.

FIGS. 11–15 pertain to another modification where an improved truck stake pocket 49 serves the basic principle of this invention when engaged with a conventional intermediary truck stake receptacle 45 and the, inserted therein, end-section of a conventional (straight) truck stake 44.

Here the inside walls of a truck stake pocket 49 are tilted inwardly in relation to the truck loading platform 50 to which and to the truck frame 51 said pocket 49 is conventionally secured in a dependent position, as shown in FIG. 14.

Thereby, when the end-section of the conventional stake 44 (FIG. 11) is inserted into the conventional intermediary stake receptacle 45 via a conventional opening and mounting 46 (FIG. 12) and is nailed or bolted therein via openings 47 and 48 in the side walls of receptacle 45 (FIG. 13), and said assembly is inserted via receptacle 45 into the improved truck stake pocket 49 (as shown in FIG. 15), the stake 44 will assume inwardly tilted position in relation to the truck loading platform 50, and serve substantially as described in reference to the stake 21 in FIG. 5.

FIGS. 16-20 pertain to still another modification where an improved truck stake pocket 56 and a one-piece improved but conventionally straight truck stake 52 inserted therein via its end-section 55 serve the basic principle of this invention without an intermediary truck-stake receptacle.

Here the improved truck stake pocket 56 (FIG. 18), conventionally secured to the truck loading platform 57 and the truck frame 58, is substantially the same as the improved truck stake pocket 49 in FIG. 14, especially in reference to its tilting inner walls in relation to the truck loading platform.

One-piece straight truck stake 52 (FIGS. 16,17 and 20) in its entirety can be made of a cast, forged or extruded lightweight heat-treatable metal or of likewise suitable and durable material. It has a lower, relatively short, section 55 (FIGS. 16 and 17) of size, shape and form adapted to fit directly into and in the improved truck stake pocket 56 (FIG. 20).

If desired, for additional strength and stability, it may be provided with sidewise protruding section 54 adapted to assume a dependent position directly over the upper edges of pocket 56 and even farther, i.e. over the adjacent section of the loading platform 57 when stake section 55 is fully inserted into the pocket 56, as shown in FIG. 20, because said section 54 in its sidewise protrusion is tilted in relation to the straightness of stake 52, as can be observed in FIG. 17.

When the stake 52 is so inserted, its elongated section 53 will apparently assume inwardly tilted position in relation to the truck loading platform 57, and will serve substantially as described in reference to the stake 21 in FIG. 5.

Stake 52 may be provided with plain or threaded openings 52A, 52B and like for bolts or screws 61,62 and like to secure conventional horizontal side boards, 59,60 and like (FIG. 17).

To reduce weight of the stake 52 without substantial sacrifice of its strength, an opening 56B (FIG. 16) or like or more and of any desired configuration may be provided along and through the front and back walls of the stake; and/or sections or section (like section 63) of the back of the stake 52 may be hollowed, for instance, as indicated by dotted lines in FIG. 17.

If desired, a means may be provided for an inconspicuous locking of the stake 52 to the truck pocket 56, for instance, a threaded opening 56A (FIGS. 16 and 17) may be provided in the bottom wall of stake 52, an oversized washer 59 (FIG. 20) may be placed under and against the lower edges of pocket 56, and a screw 60A inserted through the washer 59 and screwed into the threaded opening 56A of stake 52.

Manufacturers of truck stakes ordinarily made them in various lengths to accommodate various needs, however a user may need in his truck a shorter stake for a certain length of time, and then a longer stake for another length of time. Ordinarily such user would have to use either a longer stake all the time, which would be clumsy and in way when not needed, or buy stakes of various lengths and change them for various load heights.

Instead, a separate stake extension, for instance, like an extension 64, FIG. 21, may be provided and adapted for easy removable securement with and over a truck stake upper end-section, and other likewise extensions successively, for extending or reducing the stake length as needed without replacing the stake itself. Such extensions may be comfortably short for cheaper than stake cost and for easy storage when not needed.

Hollowed end section 65 in the extension 64 is provided and adapted for receiving the upper end-section 66 of stake 52, which may be recessed, as shown, for better blending of stake 52 with the extension 64. Likewise recessed upper end-section 67 of the extension 64 may be provided for likewise purpose and engagement with likewise hollowed lower end-section of another similar extension, and so forth. Extension 64 and like may be additionally secured over and with their respective engagements by any suitable means, for instance, bolts, screws etc. through therefor provided holes in the walls of the respective male and female members, for example, a hold 68 in the upper end-section 66 of stake 52, and a threaded matching hole 69 into the hollowed end-section 65 of extension 64 and engaged by a screw 70 therein, which screw may be tightened into slightly undersized matching hole 68 when both holes assume a dependent position opposite each other.

We claim as our invention:

1 For a truck and like with a substantially horizontal truck loading platform, a substantially perpendicular thereto truck-stake oversized pocket and a substantially straight truck-stake, an intermediary stake receptacle having an exterior surface means for fitting into said stake pocket, and having an interior surface means for receiving an end section of said stake, and said interior surface means are angular in relation to said exterior surface means for inwardly inclining the stake towards a truck load when the latter is loaded over the truck loading platform and said end section of the stake is engaged with said interior surface means of the intermediary stake receptacle.

* * * * *